United States Patent
Taniguchi et al.

(10) Patent No.: US 7,049,789 B2
(45) Date of Patent: May 23, 2006

(54) AUTOMOTIVE POWER SUPPLY SYSTEM DESIGNED TO ENSURE STABILITY IN CHARGING STORAGE BATTERIES

(75) Inventors: Makoto Taniguchi, Oobu (JP); Masahiko Osada, Okazaki (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/974,860

(22) Filed: Oct. 28, 2004

(65) Prior Publication Data
US 2005/0093508 A1 May 5, 2005

(30) Foreign Application Priority Data
Oct. 29, 2003 (JP) .............................. 2003-369498

(51) Int. Cl.
*H02J 7/00* (2006.01)
(52) U.S. Cl. ....................... 320/104; 320/123
(58) Field of Classification Search ............... 320/104, 320/128, 123; 180/65.1, 65.2
See application file for complete search history.

(56) References Cited

U.S. PATENT DOCUMENTS

| | | | |
|---|---|---|---|
| 4,021,677 A * | 5/1977 | Rosen et al. ............... | 180/65.2 |
| 6,220,383 B1 * | 4/2001 | Muraki et al. ............. | 180/68.5 |
| 6,624,618 B1 * | 9/2003 | Kernahan et al. ............. | 322/90 |
| 6,765,312 B1 | 7/2004 | Urlass et al. | |
| 6,794,847 B1 * | 9/2004 | Hosoda et al. .............. | 320/104 |

FOREIGN PATENT DOCUMENTS

| | | |
|---|---|---|
| JP | A 6-209532 | 7/1994 |
| JP | B2 2508767 | 4/1996 |
| JP | A 2004-222473 | 8/2004 |
| WO | WO 01/36232 A1 | 5/2001 |
| WO | WO 03/004315 A2 | 1/2003 |

* cited by examiner

*Primary Examiner*—Karl Easthom
*Assistant Examiner*—Robert Grant
(74) *Attorney, Agent, or Firm*—Oliff & Berridge, PLC

(57) ABSTRACT

An automotive power supply system which has two storage batteries mounted in a vehicle which are charged by the electrical energy produced by an electric generator driven by an engine of the vehicle. The system includes a switching device which works to switch between electric connections of the generator to the batteries as functions of predetermined parameters, thereby ensuring the stability in charging and keeping the batteries within a desired serviceable capacity range.

9 Claims, 10 Drawing Sheets

AUTOMOTIVE POWER SUPPLY SYSTEM DESIGNED TO ENSURE STABILITY IN CHARGING STORAGE BATTERIES

CROSS REFERENCE TO RELATED DOCUMENT

The present application claims the benefit of Japanese Patent Application No. 2003-369498 filed on Oct. 29, 2003, the disclosure of which is incorporated herein by reference.

BACKGROUND OF THE INVENTION

1. Technical Field of the Invention

The present invention relates generally to an automotive power supply system, and more particularly to such a system designed to ensure the stability in charging a plurality of storage batteries installed in an automobile.

2. Background Art

In recent years, automobiles have been computerized and equipped with various electronics and electrically-operated accessories or devices, thus resulting in an increased electrical power consumption. In order to ensure the stability in supplying required electric power, there have been proposed use of two storage batteries in automobiles. For example, WO 03/004315, U.S. Pat. No. 6,765,312 (WO 01/36232), and Japanese Patent No. 2508767 disclose dual battery vehicles.

It is advisable that typical automobiles have two storage batteries mounted in different locations in light of vehicle weight balance or ease of replacement of the batteries. For instance, one of the batteries may be mounted in an engine compartment, while the other may be mounted in a trunk.

The batteries are usually connected to an electric generator (i.e., an alternator) so that they are charged by electrical energy produced by the generator. The generator is usually installed in the engine compartment and driven by an engine of the automobile. Therefore, one of the batteries in the engine compartment is located closer to the generator, while the other mounted in, for example, the trunk is located far away from the generator. This results in a difference in impedance between power supply cables connecting the generator with the batteries, which leads to a difficulty in charging both the batteries to a desired energy simultaneously. In order to avoid this problem, the above-listed WO 03/004315 teaches use of a DC—DC converter which is interposed between the generator and the batteries to compensate for a voltage drop of the batteries, thereby enabling the batteries to be charged to a desired energy simultaneously.

However, modern automotive electric generators are required to have an increased rated capacity more than 100 A. DC—DC converters suited for such a large amount of power are very expensive. It may be proposed to install two generators in the automobile to charge the batteries independently, but it is difficult due to spatial restrictions.

SUMMARY OF THE INVENTION

It is therefore a principal object of the invention to avoid the disadvantages of the prior art.

It is another object of the invention to provide an automotive power supply system designed to ensure the stability in charging a plurality of storage batteries to a desired energy without use of expensive DC—DC converters.

According to one aspect of the invention, there is provided an automotive power supply system which comprises: (a) an electric generator which is driven by an output of an internal combustion engine of a vehicle to produce an electrical energy: (b) a plurality of storage batteries which are charged by the electrical energy produced by the electric generator, the storage batteries working to supply electric power to electric devices mounted in the vehicle; (c) a switching device working to establish an electric connection between a selected one of the storage batteries and the electric generator to charge the selected one; and (d) a switch drive controller working to control an operation of the switching device.

The above structure the power supply system permits the batteries to be charged desirably which have different target charged voltages because impedances of the batteries or power supply cables connecting between the generator and the batteries are different from each other. For instance, even in a case where one of the batteries is mounted in an engine compartment, and the other is mounted in a rear trunk, the power supply system is capable of charging all the batteries to the target charged voltages. In other words, the power supply system of the invention increases the degree of freedom to install the batteries in the vehicle and allows use of batteries different in rated voltage from each other.

In the preferred mode of the invention, the switch drive controller may include (a) a state-of-charge monitor working to monitor a state of charge of each of the storage batteries, (b) a decision circuit working to determine whether the state of charge of each of the storage batteries lies within a given serviceable range or not, and (c) a switch driver working to establish an electric connection between the electric generator and one of the storage batteries which is determined by the decision circuit to have the state of charge thereof lying out of the given serviceable range.

The decision circuit may compare the state of charge of each of the storage batteries with a given lower limit and determine that the state of charge lies within the serviceable range if it is higher than the lower limit and that the state of charge lines out of the serviceable range if it is lower than the lower limit.

The decision circuit may also compare the state of charge of each of the storage batteries with a given upper limit and determine that the state of charge lies within the serviceable range if it is lower than the upper limit and that the state of charge lines out of the serviceable range if it is higher than the upper limit.

At least one of the storage batteries may be installed in one of a vehicle cabin and a trunk. It is generally difficult to install all the batteries within an engine compartment. Installation of any of the batteries in a location other than the engine compartment, as described above, requires use of a DC—DC converter. The power supply system of this invention is designed to use the switching device to charge the batteries selectively without use of the expensive DC—DC converter.

The storage batteries may be different in rated voltage from each other.

The switch drive controller may work to switch between electric connections between the electric generator and the storage batteries in a time interval longer than a response time of the electric generator and a response time of each of the storage batteries, thereby ensuring the stability in charging and keeping the batteries at a desired capacity at all times.

The storage batteries may be different in charging impedance from each other. The switch drive controller may control the switching device to connect the generator to one of the storage batteries which is lower in the charging impedance than any other of the storage batteries when the vehicle is decelerating. The switch drive controller may also work to increase an amount of electricity produced by the generator when the vehicle is decelerating. Usually, when the vehicle is decelerating, the electrical energy to be developed by the generator is allowed to be increased by use of mechanical energy created by the deceleration of the vehicle. Thus, when the vehicle is decelerating, the electric connection between the generator and one of the storage batteries which is lower in the charging impedance may be established to charge the battery effectively using the increased electrical energy produced by the generator.

The switch drive controller may include (a) a power consumption monitor working to monitor a power consumption of the electric device from a corresponding one of the storage batteries, (b) a connection duration determining circuit working to determine a connection duration for which the electric connection between each of the storage batteries and the electric generator is to be established as a function of the power consumption from a corresponding one of the storage batteries, and (c) a switch driver working to control the switching device so as to establish the electric connection for the connection duration.

As the power consumption from each of the storage batteries increase, the connection duration determining circuit may increase a corresponding one of the connection durations.

The switch drive controller may include (a) an engine starter monitor working to determine whether an engine starter motor is operating or not and (b) a switch driver working to connect the electric generator and one of the storage batteries from which the electrical energy is consumed by the engine starter motor when the engine starter monitor determines that the engine starter motor is operating.

The switch drive controller may also include a state-of-charge monitor working to determine whether a state of charge of the one of the storage batteries from which the electrical energy is consumed by the engine starter motor has reached a given level of not. The switch drive controller may continue to establish the electric connection between the electric generator and the one of the storage batteries until the state-of-charge monitor determines that the state of charge of the one of the storage batteries has reached the given level.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
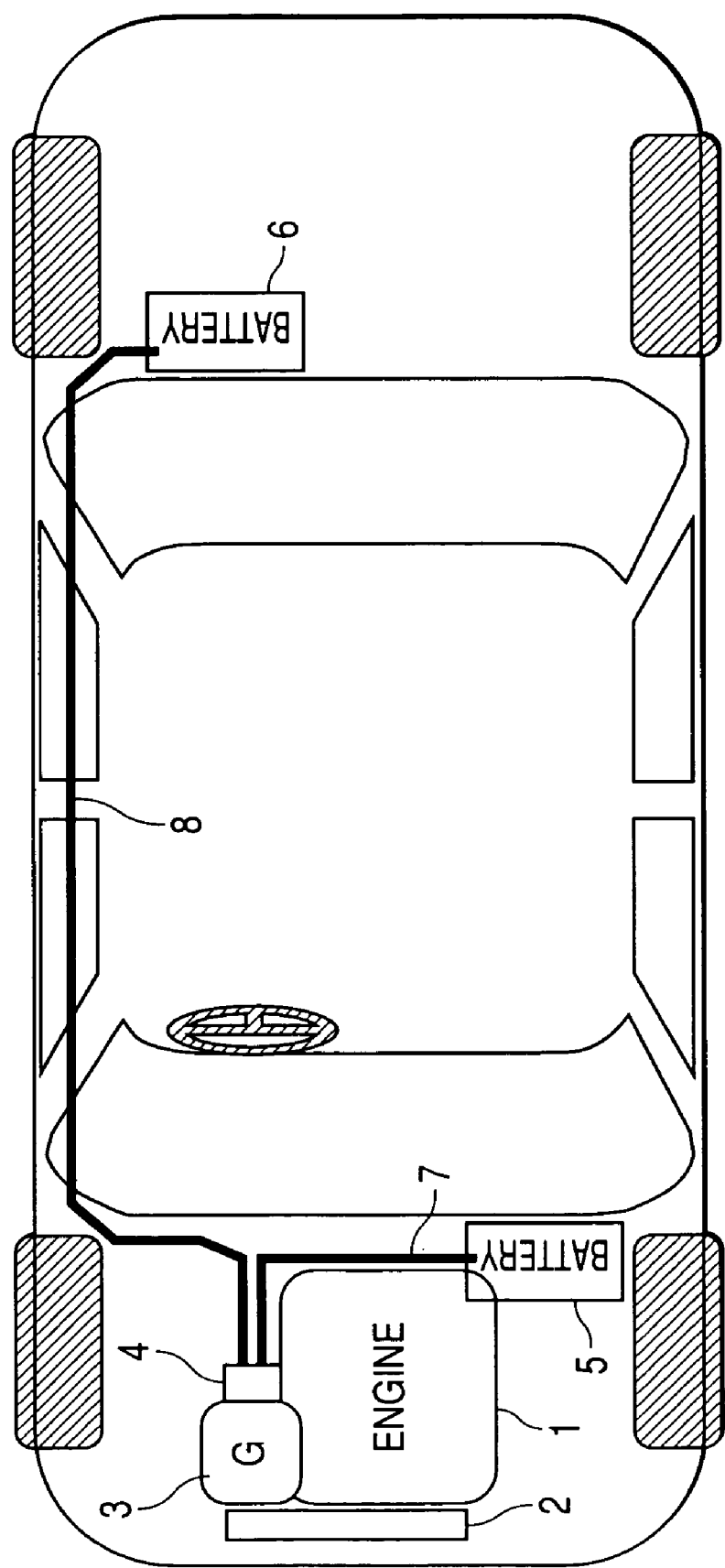
FIG. 1 is a schematic illustration which shows an automobile equipped with an automotive power supply control system according to the invention.
Figure 2:
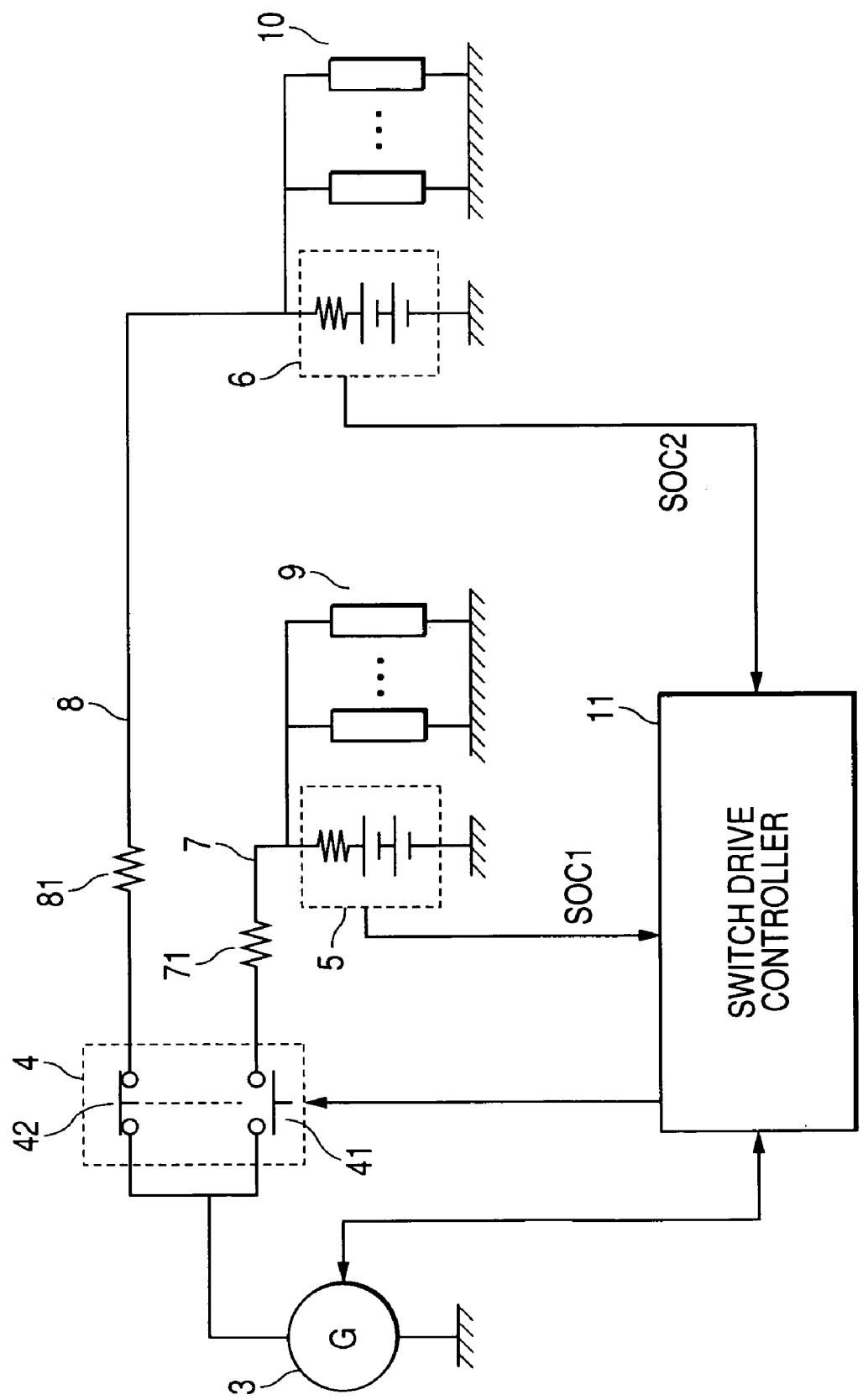
FIG. 2 is a block diagram which shows a power supply system according to the first embodiment of the invention.
Figure 3:
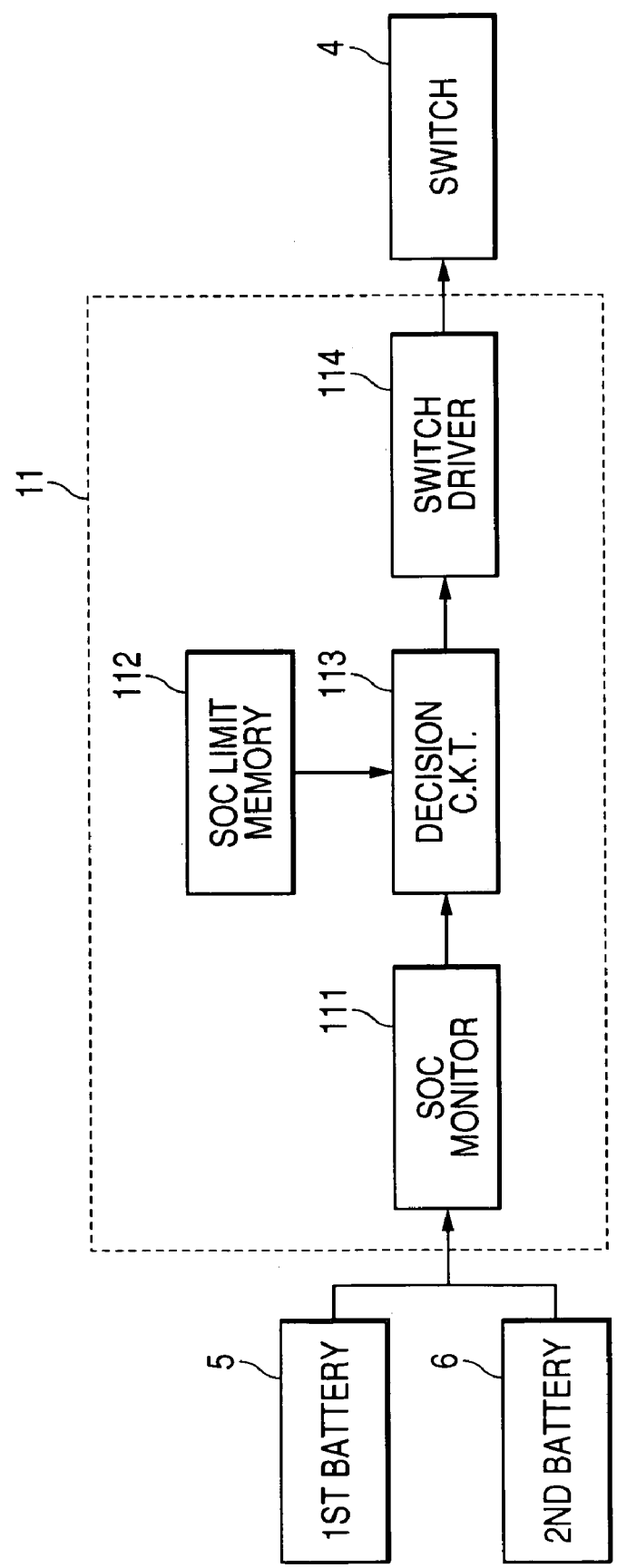
FIG. 3 is a block diagram which shows a circuit structure of a switch drive controller of the power supply system of FIG. 2.

Referring to the drawings, wherein like reference numbers refer to like parts in several views, particularly to FIGS. 1 to 3, there is shown an automotive power supply system according to the first embodiment of the invention.

The automotive power supply system, as can be seen from FIG. 1, consists of an automotive internal combustion engine 1, a drive belt 2, an electric generator 3, a switching device 4, a first storage battery 5, a second storage battery 6, a first power supply cable 7, a second power supply cable 8, and a switch drive controller 11, as illustrated in FIG. 2.

The engine 1 is started upon actuation of an engine starter (not shown) and produces torque to drive the vehicle. The torque is also used to rotate the generator 3 through the belt 2 to produce electric power.

The switching device 4 works to selectively establish one of electric communications between the generator 3 and the first battery 5 and between the generator 3 and the second battery 6. Specifically, when the generator 3 is placed in connection with the first battery 5, the electric communication between the generator 3 and the second battery 6 is blocked. Alternatively, when the generator 3 is placed in connection with the second battery 6, the electric communication between the generator 3 and the first battery 5 is blocked.

The first battery 1 is mounted near the engine 1 within a front engine compartment. The first power supply cable 7 connects between a battery-side terminal (not shown) of the switching device 4 and the first battery 5. Specifically, the generator 3 and the first battery 5 are connected together through the switching device 4 and the first power supply cable 7. The first power supply cable 7 extends within the engine compartment. The first battery 5 is implemented by a lead acid battery.

The second battery 6 is mounted in a rear trunk (i.e., a luggage compartment). The second power supply cable 8 connects with the battery-side terminal of the switching device 4 and the battery 6. Specifically, the generator 3 and the second battery 6 are connected together through the switching device 4 and the second power supply cable 8. The second power supply cable 8 extends from the engine compartment to the rear trunk. The second battery 6 is implemented by a lead acid battery which is identical in capacity and rated voltage with the first battery 5.

The switching device 4, as clearly shown in FIG. 2, is made up of a first switch 41 designed to complete or break the connection between the generator 3 and the first power supply cable 7 and a second switch 42 designed to complete or break the connection between the generator 3 and the second power supply cable 8. The first and second switches 41 and 42 are opened or closed selectively. Specifically, when one of the first and second switches 41 and 42 is opened, the other is closed.

To the first battery 5, a first electric device group 9 is connected which is made up of a plurality of accessories such as headlights, an air conditioner, and an electric fan which are mounted on a front side of the vehicle body and to be actuated by electric power supplied from the first battery 5. To the second battery 6, a second electric device group 10 is connected which is made up of a plurality of accessories such as rear combination lamps, a defogger, and an air cleaner which are mounted on a rear side of the vehicle body and to be actuated by electric power supplied from the first battery 6.

The first and second power supply cables 7 and 8 usually have impedances which are illustrated as first and second impedances 71 and 81 in FIG. 2 in the form of lumped constants. The first power supply cable 7 is, as described above, installed within the front compartment of the vehicle. The second power supply cable 8 extends from the front compartment to the rear trunk and is longer than the first power supply cable 7. The first impedance 71 is, thus, smaller than the second impedance 81.

The switch drive controller 11 works to output a switch control signal to the switching device 4 to open only either one of the first and second switches 41 and 42 selectively. The switch drive controller 11 monitors a SOC1 signal indicative of State Of Charge of the first battery 5 (i.e., an available reserve capacity or residual electrical energy) and a SOC2 signal indicative of SOC of the second battery 6 and performs a decision operation, as described below, to produce the switch control signal to the switching device 4.

The switch drive controller 11, as clearly shown in FIG. 3, consists of a state-of-charge (SOC) monitor 111, a SOC threshold limit memory 112, a decision circuit 113, and a switch driver 114. The SOC monitor 111 receives the SOC1 and SOC2 signals indicative of the SOCs of the first and second batteries 5 and 6, respectively, which will also be referred to as first and second SOCs below.

The SOC threshold limit memory 112 stores therein a lower SOC limit th1 at which the capacities remaining in the first and second batteries 5 and 6 become unuseful and an upper SOC limit th2 at which the first and second batteries 5 and 6 are fully charged. When the first and second SOCs of the first and second batteries 5 and 6 drop below the lower SOC limit th1, it may cause the first and second electric device groups 9 and 10 to function improperly. Alternatively, when the first and second SOCs of the first and second batteries 5 and 6 exceed the upper SOC limit th2, it means that the first and second batteries 5 and 6 are overcharged undesirably.

The decision circuit 113 works to determine whether the first and second batteries 5 and 6 are charged desirably or not and output the control signal to the switching device 4. Specifically, the decision circuit 113 compares the first SOC of the first battery 5 with the lower SOC limit th1. When it is determined that the first SOC is lower than the lower SOC limit th1, the decision circuit 113 outputs the control signal to the switching device 4 to close the first switch 41. Additionally, the decision circuit 113 also compares the first SOC of the second battery 5 with the upper SOC limit th2. When it is determined that the first SOC is greater than the upper SOC limit th2, the decision circuit 113 outputs the control signal to the switching device 4 to open the first switch 41. Similarly, the decision circuit 113 compares the second SOC of the second battery 6 with the lower and upper SOC limits th1 and th2. When it is determined that the second SOC is lower than the lower SOC limit th1, the decision circuit 113 closes the second switch 42. Alternatively, when it is determined that the second SOC is greater than the upper SOC limit th2, the decision circuit 113 opens the second switch 42.

The switch driver 114 works to receive the control signal outputted from the decision circuit 113 and drive the switching device 4.

Figure 4A:
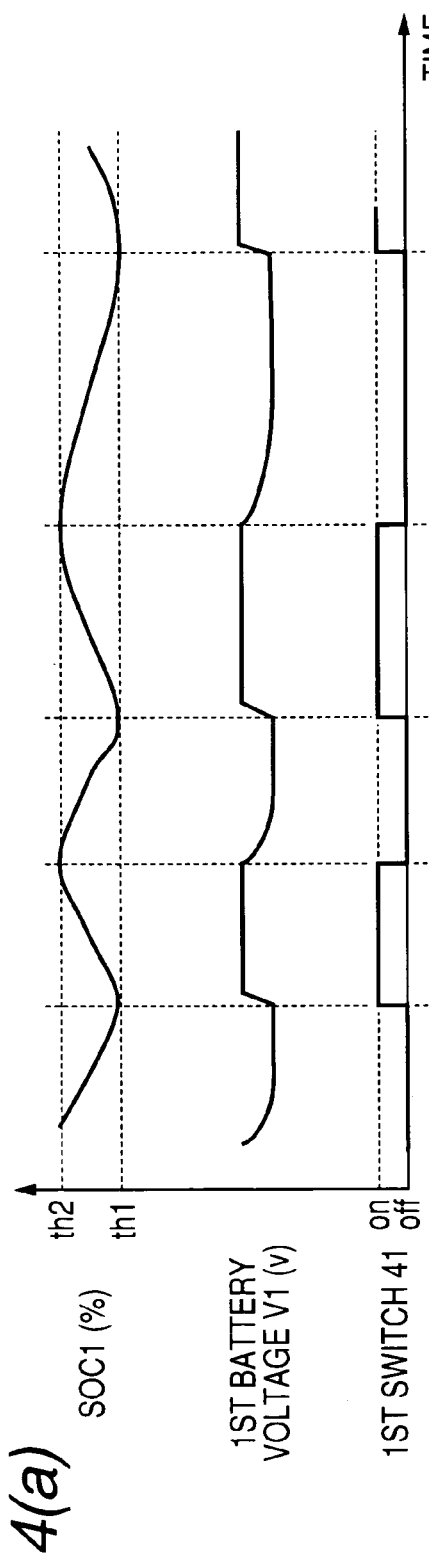
FIG. 4(a) is a time chart which shows an on-off operation of a first switch in terms of a state of charge and a voltage of a first battery.
Figure 4B:
FIG. 4(b) is a time chart which shows an on-off operation of a second switch in terms of a state of charge and a voltage of a second battery.

FIGS. 4(a) and 4(b) show examples of controlled time-sequential operations of the first and second switches 41 and 42 in terms of the first and second SOCs of the first and second batteries 5 and 6.

In the example of FIG. 4(a), the SOC of the first battery 5, as denoted at SOC1, is first near the upper SOC limit th2, that is, the first battery 5 is charged almost fully. The SOC of the second battery 6, as denoted at SOC 2, is lower than the lower SOC limit th1, so that the second electric device group 9 may function improperly. The decision circuit 113, therefore, turns off or opens the first switch 41 while turning on or closing the second switch 42, thereby establishing the electric connection between the generator 3 and the second battery 6 and interrupting the electric connection between the generator 3 and the first battery 5. This causes the first battery 5 disconnecting with the generator 3 to drop in voltage level gradually and the second battery 5 connecting with the generator 3 to rise in voltage level rapidly.

Subsequently, when the SOC of the first battery 5 drops below the lower SOC limit th1 at time t1, the decision circuit 113 turns on or closes the first switch 41. The SOC of the second battery 6 has reached the upper SOC limit th2 at time t1. The decision circuit 113, thus, turns off or opens the second switch 42. This establishes the electric connection between the generator 3 and the first battery 5 and interrupts the electric connection between the generator 3 and the second battery 6, thereby keeping the SOCs of the first and second batteries 5 and 6 at available levels at all the time.

Specifically, the decision circuit 113 works to maintain the reserve electrical energy of each of the first and second batteries 5 and 6 within a serviceable capacity range intermediate between an overcharged capacity (i.e., the upper SOC limit th2) and an undercharged capacity (i.e., the lower SOC limit th1). Note that changes in on-off cycle of the first and second switches 5 and 6 in the examples of FIGS. 4(a) and 4(b) are caused by changes in consumption of electrical energy of the first and second batteries 5 and 6.

The first and second batteries 5 and 6 may alternatively be different in rated voltage. Either or both of the first and second batteries 5 and 6 may be implemented by another type of storage battery such as a lithium-ion storage battery.

Figure 5:
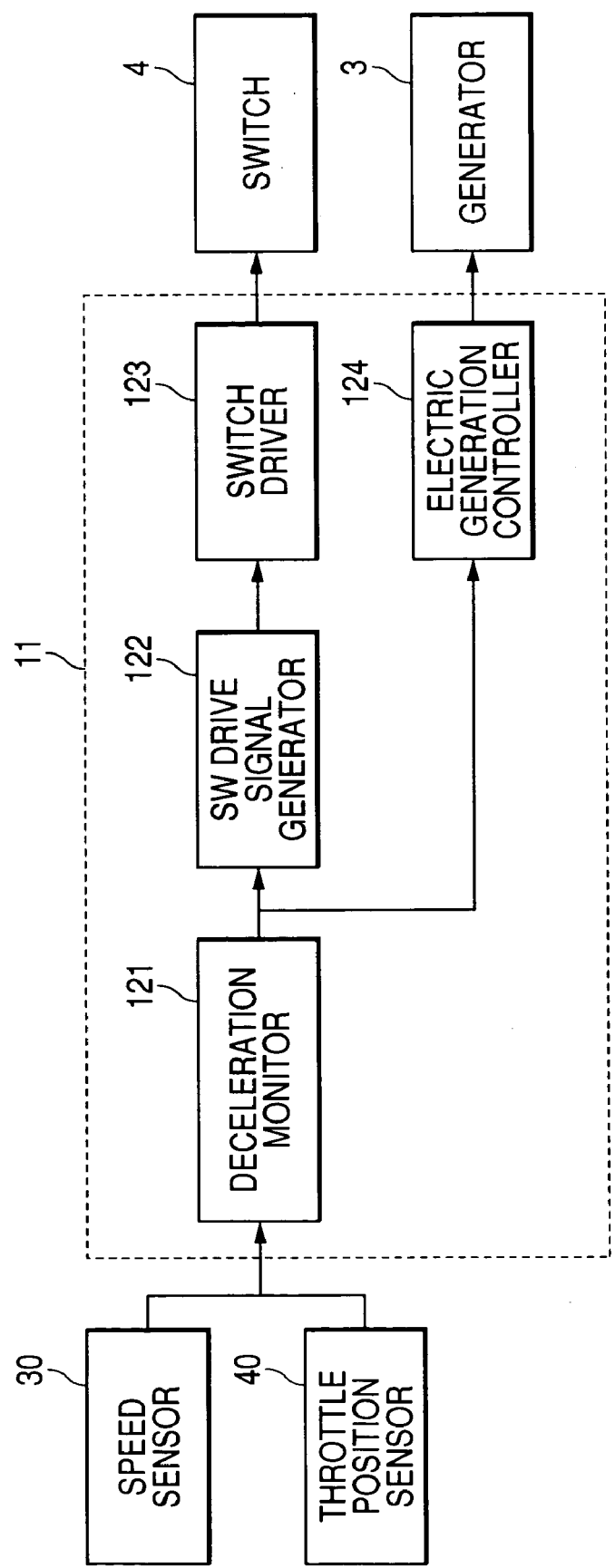
FIG. 5 is a block diagram which shows a circuit structure of a switch drive controller of an automotive power supply system according to the second embodiment of the invention.

FIG. 5 shows a switch drive controller 11 of the automotive power supply system according to the second embodiment of the invention.

The automotive power supply system of this embodiment includes a speed sensor 30 and a throttle position sensor 40. The speed sensor 30 works to measure the speed of the vehicle equipped with the automotive power supply system and output a signal indicative thereof to the switch drive controller 11. The throttle position sensor 40 works to measure the degree of opening, i.e., a valve position of a throttle valve (not shown) of the engine 1 and output a signal indicative thereof to the switch drive controller 11.

The switch drive controller 11 consists of a deceleration monitor 121, a switch drive signal generator 122, a switch driver 123, and an electric generation controller 124. Other arrangements of the automotive power supply system are identical with those in the first embodiment, and explanation thereof in detail will be omitted here.

The deceleration monitor 121 monitors the outputs of the speed sensor 30 and the throttle position sensor 40 to determine whether the vehicle is now decelerating or not and outputs signals indicative thereof to the switch drive signal generator 122 and the electric generation controller 124.

The switch drive signal generator 122 works as a switching controller which receives the output of the deceleration monitor 121 and provide a switch control signal to the switch driver 123. Specifically, when it is determined that the vehicle is now decelerating, the switch drive signal generator 122 outputs the switch control signal to the switching device 4 through the switch driver 123 to close the first switch 41 leading to the first battery 5 through the lower impedance power supply cable 7 and open the second switch 42. Alternatively, when it is determined that the vehicle is not now decelerating, the switch drive signal generator 122 outputs the switch control signal to the switching device 4 through the switch driver 123 to close the second switch 42 leading to the second battery 6 through the higher impedance power supply cable 8 and open the first switch 41.

The switch driver 123 outputs the switch control signal produced by the switch drive signal generator 122 to the switching device 4 to control the operation thereof.

The electric generation controller 124 works to regulate the electricity to be produced by the generator 3 based on the output of the deceleration monitor 121. Specifically, when it is determined that the vehicle is now decelerating, the electric generation controller 124 controls the generator 3 so as to develop a higher voltage of 15V. Alternatively, when it is determined that the vehicle is not now decelerating, the electric generation controller 124 controls the generator 3 so as to develop a lower voltage of 14V.

Figure 6:
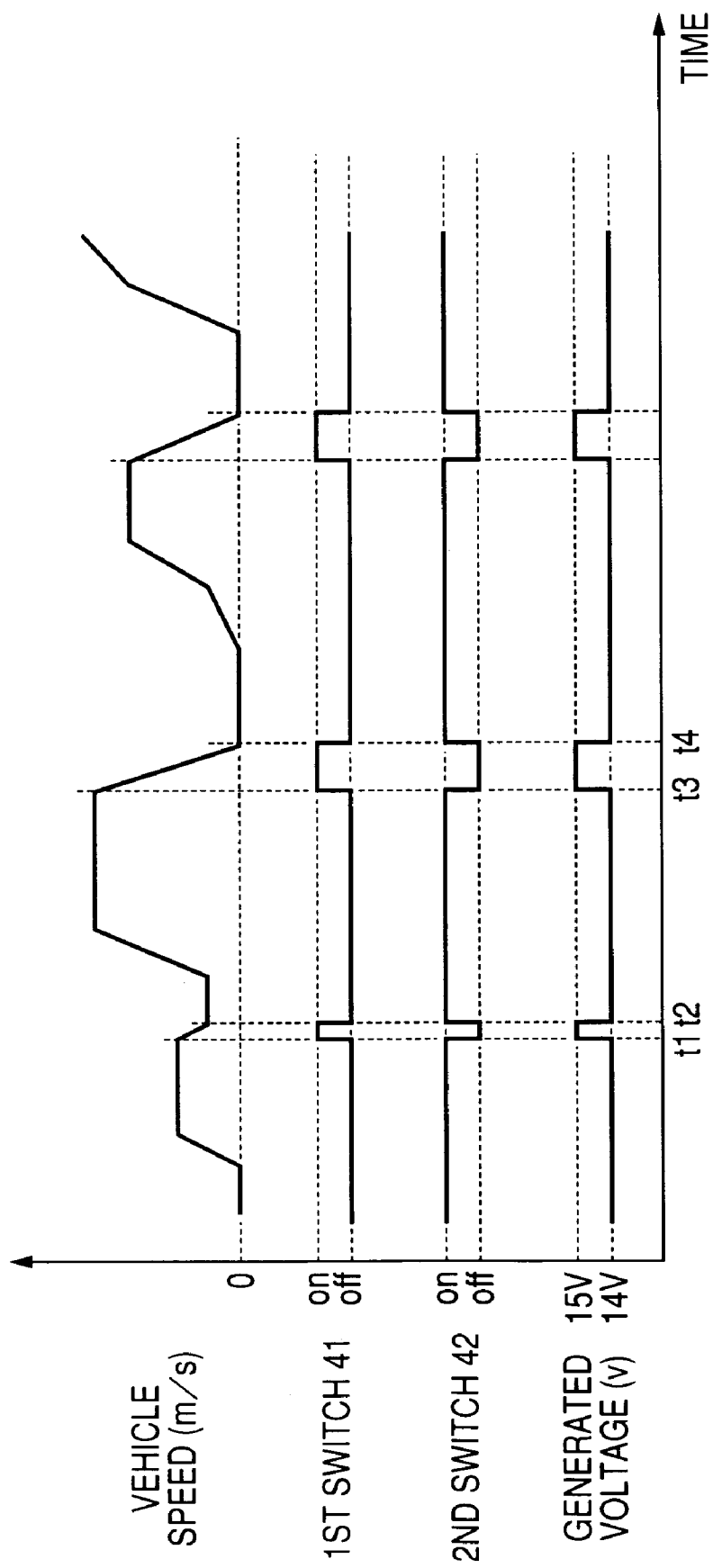
FIG. 6 is a time chart which shows on-off operations of a first and a second switch in terms of the speed of a vehicle and the voltage developed by a generator.

FIG. 6 shows an example of operation of the switch drive controller 11 of this embodiment.

The speed of the vehicle is first zero (0). The deceleration monitor 121, thus, determines that the vehicle is not decelerating. The switch drive signal generator 122 outputs the switch control signals to open the first switch 41 and close the second switch 42. The electric generation controller 124 controls the generator 3 to develop a lower voltage of 14V.

When the vehicle begins to decelerate at time t1, the deceleration monitor 121 determines that the vehicle is now decelerating. The switch drive signal generator 122 outputs the switch control signals to close the first switch 41 and open the second switch 42. The electric generation controller 124 controls the generator 3 to develop a higher voltage of 15V.

When the vehicle stops decelerating at time t2, the deceleration monitor 121 determines that the vehicle is not now decelerating. The switch drive signal generator 122 outputs the switch control signals to open the first switch 41 and close the second switch 42. The electric generation controller 124 controls the generator 3 to develop a lower voltage of 14V. Subsequently, the switch drive controller 11 operates in a similar manner depending upon whether the vehicle is decelerating or not.

As apparent from the above discussion, when the vehicle is decelerating, the switch drive controller 11 works to increase the amount of electricity developed by the generator 3 and connect the generator 3 to the first battery 5 to which the lower impedance power supply cable 7 is joined, thereby increasing the efficiency of conversion of energy developed by the deceleration of the vehicle into electrical energy to be stored in the first battery 5. The structure of the switch drive controller 11 eliminates the need for complex switching control. The switching drive controller 11 is designed to turn on of off only depending upon whether the vehicle is decelerating or not, thus decreasing on-off operations of the switching device 4, which results in a decreased switching-caused energy loss.

The switch drive controller 11 of the second embodiment is designed to determine to which of the first and second batteries 5 and 6 the generator 3 is to be connected based on comparison between the impedances 71 and 81 of the first and second power supply cables 7 and 8. This is because the first and second batteries 5 and 6 are lead acid batteries identical in rated voltage and storage capacity with each other. In practice, it is advisable that the above determination be made not only in light of the impedances 71 and 81, but also in light of internal impedances of the first and second batteries 5 and 6. Usually, a charging impedance of the first battery 5 is the sum of the impedance 71 of the first power supply cable 7 and the internal impedance of the first battery 5. Similarly, a charging impedance of the second battery 6 is the sum of the impedance 81 of the second power supply cable 8 and the internal impedance of the second battery 6. For example, in a case where the first battery 6 is implemented by a lead acid battery, wile the second battery 6 is implemented by a lithium-ion battery, the internal impedance of the second battery 6 is much lower than that of the first battery 5, so that the charging impedance of the second battery 6 will be lower than that of the first battery 5. In such a case, when the vehicle is decelerating, the switch drive controller 11 closes the second switch 42 to connect the generator 3 with the second battery 6.

The electric generation controller 124, as described above, increases the amount of electricity of the generator 3 during deceleration of the vehicle. Usually, when the vehicle is decelerating, the throttle valve of the engine 1 is closed to minimize the quantity of fuel to be injected into the engine 1. Such an increase in amount of electricity to be generated by the generator 3, therefore, does not result in an increased consumption of fuel of the engine 1. This results in increased efficiency of conversion of mechanical energy provided by the deceleration of the vehicle into electrical energy in the generator 3.

Figure 7:
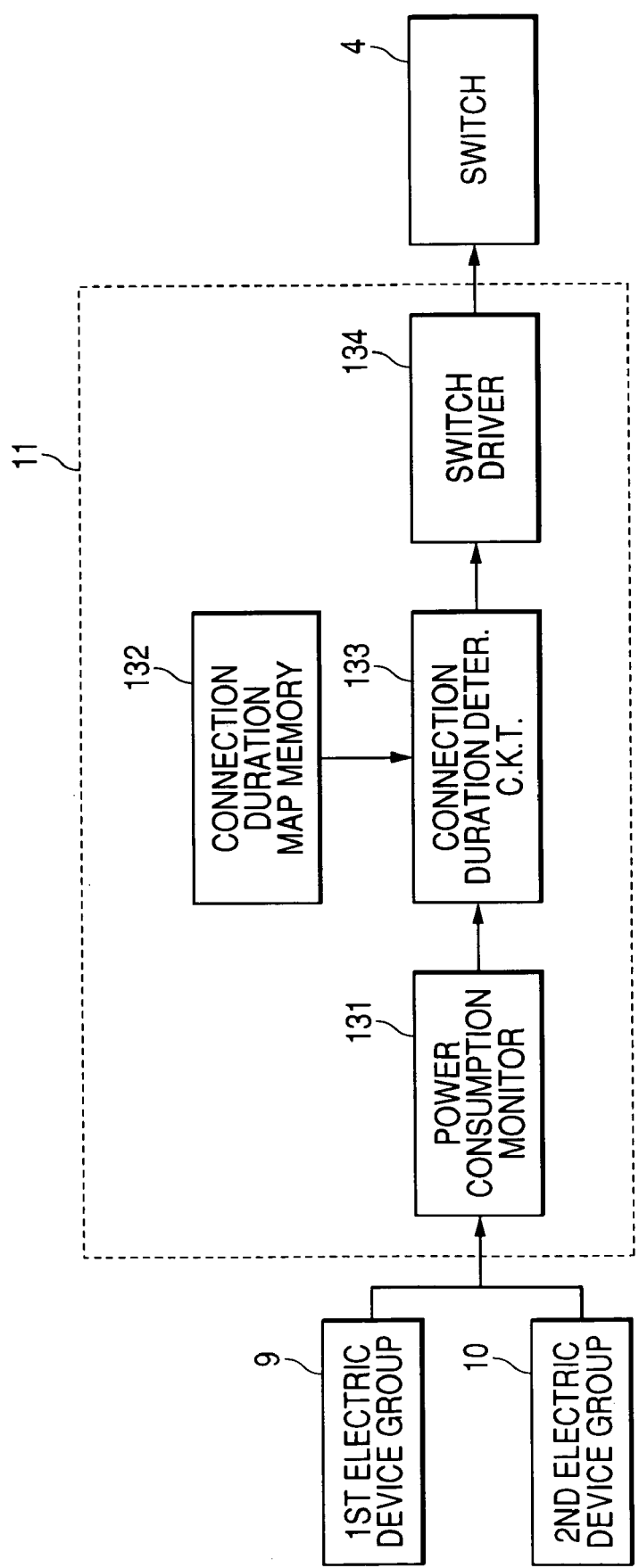
FIG. 7 is a block diagram which shows a circuit structure of a switch drive controller of an automotive power supply system according to the third embodiment of the invention.

FIG. 7 shows a switch drive controller 11 of the automotive power supply system according to the third embodiment of the invention. Other arrangements of the automotive power supply system are identical with those in the first embodiment, and explanation thereof in detail will be omitted here.

The switch drive controller 11 consists of a power consumption monitor 131, a connection duration map memory 132, a connection duration determining circuit 133, and a switch driver 134.

The power consumption monitor 131 works to monitor total amounts of electrical energy consumed by the first electric device group 9 and the second electric device group 10, respectively. Usually, the amount of electrical energy consumed by each electric device of the vehicle is changed with time by a manual on-off operation of a vehicle driver or a running condition of the vehicle. The power consumption monitor 131, thus, monitors an instantaneous total amount of electrical energy being consumed by each of the first and second electric device groups 9 and 10 (i.e., the amounts of output electrical energy of the first and second batteries 5 and 6) and determines a power consumption ratio of the first electric device group 9 to the second electric device group 10 to output a signal indicative thereof to the connection duration determining circuit 133.

The connection duration map memory 132 stores a power consumption-to-connection duration map which represents a connection duration (i.e., a closed duration) of each of the switches 41 and 42 of the switching device 4 in terms of the power consumption ratio monitored by the power consumption monitor 131. Specifically, the power consumption-to-connection duration map indicates the connection duration for which one of the switches 41 and 42 of the switching device 4 leading to one of the first and second electric device groups 9 and 10 (i.e., one of the first and second batteries 5 and 6) which is greater in power consumption is to be closed. The connection duration is increased as the power consumption of a corresponding one of the batteries 5 and 6 increases and is decreased as the power consumption decreases.

The connection duration, as referred to herein, is a cycle time for which a selected one of the first and second switches 41 and 42 is to be closed, while the other is to be opened and which is set much longer than a response time of the generator 3, that is, a time constant (typically, 100 to 200 msec.) of a field winding of the generator 3 and a charging response time required to charge the first and second batteries 5 and 6 to a set voltage level. For instance, if the power consumptions of the first and second electric device groups 9 and 10 are identical with each other, the connection duration for which each of the switches 41 and 42 is to be closed is set to the same cycle time longer than 100 sec. In a case of 100 sec., the first switch 41 is kept closed for 100 sec., while the second switch 42 is kept opened for 100 sec. Subsequently, the first switch 41 is kept opened for 100 sec., while the second switch 42 is kept closed for 100 sec. In this case, an on-off cycle of each of the switches 41 and 42 is 200 sec. This sequential operation continues to be carried out until the batteries 5 and 6 are fully charged. However, if either of the first and second batteries 5 and 6 drops in voltage below a given threshold value, the connection duration determining circuit 133 may redetermine the connection duration as a function of an instantaneous value of the power consumption ration as monitored by the power consumption monitor 131. If the power consumption of the first electric device group 9 is three times greater than that of the second electric device group 10, the first switch 41 is kept closed for 150 sec., while the second switch 42 is kept opened for 150 sec. Subsequently, the first switch 41 is kept opened for 50 sec., while the second switch 42 is kept closed for 50 sec.

The connection duration, as described above, set much longer than the response times of the generator 3 and the batteries 5 and 6, thereby causing the first and second switches 41 and 42 to be brought into an on- or off-state after the generator 3 and the batteries 5 and 6 are placed in steady states thereof, thus ensuring the stability in charging the batteries 5 and 6, and also eliminating undesirable switching noises which usually arise from on-off operations of the switches 41 and 42 at a cycle of several msec.

The connection duration determining circuit 133 determines the connection durations (i.e., closed duration) of the switches 41 and 42 of the switching device 4 by look-up using the map, as stored in the connection duration map memory 132, as a function of the power consumption ratio of the first electric device group 9 to the second electric device group 10, as monitored by the power consumption monitor 131 and outputs a switching control signal to the switch driver 134. The switch driver 134 outputs a switching signal to turn on and off the first and second switches 41 and 42, respectively, for the connection durations, as determined by the connection duration determining circuit 133.

As apparent form the above discussion, the switch drive controller 11 of the third embodiment works to maintain the first and second batteries 5 and 6 within a serviceable capacity range intermediate between an overcharged capacity and an undercharged capacity. The switch drive controller 11, as described above, prolongs the connection duration of each of the switches 41 and 42 when the power consumption of a corresponding one of the batteries 5 and 6 increases, thus avoiding rapid voltage drops of the batteries 5 and 6.

Figure 8:
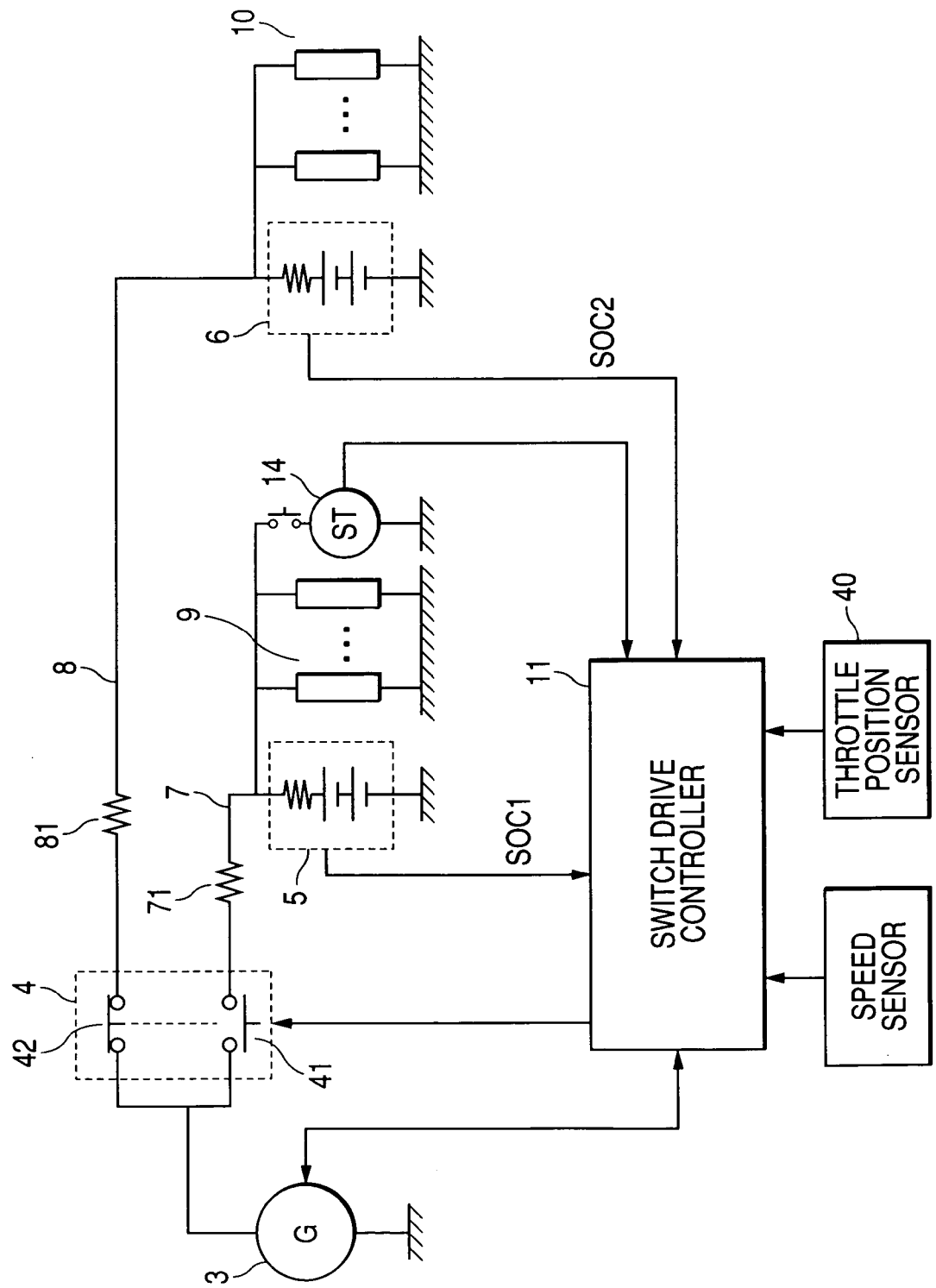
FIG. 8 is a block diagram which shows a power supply system according to the fourth embodiment of the invention.

FIG. 8 shows an automotive power supply system according to the fourth embodiment of the invention.

The automotive power supply system of this embodiment includes a speed sensor 30, a throttle position sensor 40, and an engine starter 14.

The speed sensor 30 works to measure the speed of the vehicle equipped with the automotive power supply system and output a signal indicative thereof to the switch drive controller 11. The throttle position sensor 40 works to measure the degree of opening, i.e., a valve position of a throttle valve (not shown) of the engine 1 and output a signal indicative thereof to the switch drive controller 11. The engine starter 14 is joined to the first battery 5 through an ignition switch. The engine starter 14 is equipped with an electric motor which consumes a large amount of electrical energy of the first battery 5 to start up the engine 1.

Figure 9:
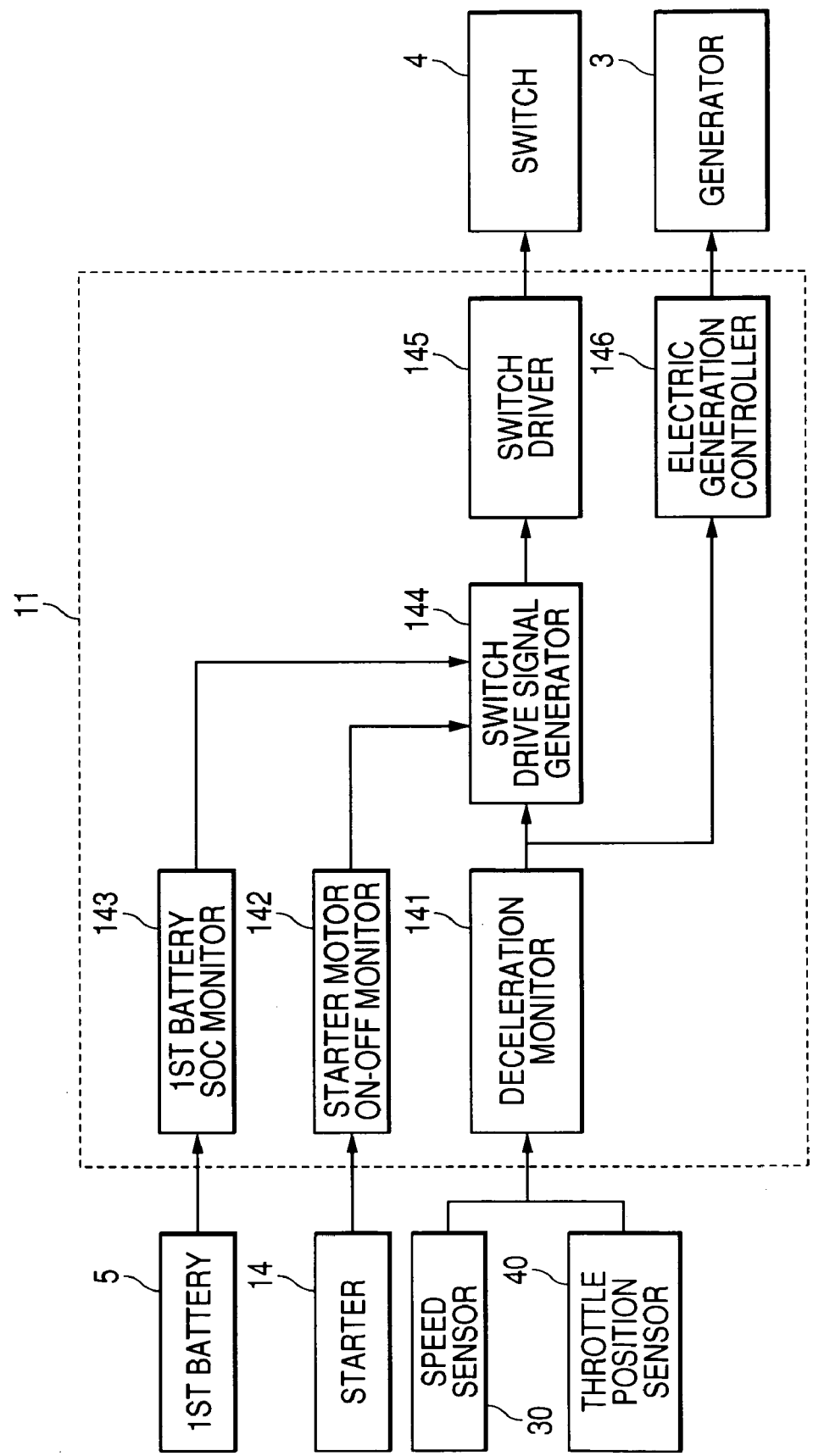
FIG. 9 is a block diagram which shows a circuit structure of a switch drive controller of the power supply system of FIG. 8.

The switch drive controller 11, as shown in FIG. 9, consists of a deceleration monitor 141, a starter motor on-off monitor 142, a first battery SOC monitor 143, a switch drive signal generator 144, a switch driver 145, and an electric generation controller 146. Other arrangements of the automotive power supply system are identical with those in the first embodiment, and explanation thereof in detail will be omitted here.

The deceleration monitor 141 monitors the outputs of the speed sensor 30 and the throttle position sensor 40 to determine whether the vehicle is now decelerating or not and outputs signals indicative thereof to the switch drive signal generator 144 and the electric generation controller 146. The starter motor on-off monitor 142 works to monitor an output (e.g., an exciting current signal) of the starter 14 to determine whether the starter motor is now operating or not and provide a signal indicative thereof to the switch drive signal generator 144.

The first battery SOC monitor 143 works to receive the SOC1 signal indicative of the SOC of the first battery 5, determine whether the SOC of the first battery 5 has reached the upper SOC limit th2 or not, and output a signal indicative thereof to the switch drive signal generator 144.

The switch drive signal generator 144 receives the output of the deceleration monitor 141 and provide a switch control signal to the switch driver 145. Specifically, when it is determined that the vehicle is now decelerating, the switch drive signal generator 144 outputs the switch control signal to the switching device 4 through the switch driver 145 to close the first switch 41 leading to the first battery 5 through the lower impedance power supply cable 7 and open the second switch 42. Alternatively, when it is determined that the vehicle is not now decelerating, the switch drive signal generator 144 outputs the switch control signal to the switching device 4 through the switch driver 145 to close the second switch 42 leading to the second battery 6 through the higher impedance power supply cable 8 and open the first switch 41.

Immediately after the engine starter 14 is turned on, the switch drive signal generator 144 selects only the outputs of the starter motor on-off monitor 142 and the first battery SOC monitor 143 to produce the switch control signal. Specifically, when the starter motor on-off monitor 142 determines that the starter motor is now operating, the switch drive signal generator 144 outputs the switch control signal to the switching device 4 through the switch driver 145 to close the first switch 41 leading to the first battery 5 through the lower impedance power supply cable 7 and open the second switch 42. The switch drive signal generator 144 keeps the first switch 41 closed and the second switch 42 opened until the first battery SOC monitor 143 determines that the SOC of the first battery 1 has reached the upper SOC limit th2. When the first battery SOC monitor 143 determines that the SOC of the first battery 1 has reached the upper SOC limit th2, the switch drive signal generator 144 produces the switch control signal based on the output of the deceleration monitor 141.

The switch driver 145 outputs the switch control signal produced by the switch drive signal generator 122 to the switching device 4 to control the operation thereof.

The electric generation controller 146 works to regulate the electricity to be produced by the generator 3 based on the output of the deceleration monitor 141. Specifically, when it is determined that the vehicle is now decelerating, the electric generation controller 146 controls the generator 3 so as to develop a higher voltage of 15V. Alternatively, when it is determined that the vehicle is not now decelerating, the electric generation controller 146 controls the generator 3 so as to develop a lower voltage of 14V.

Figure 10:
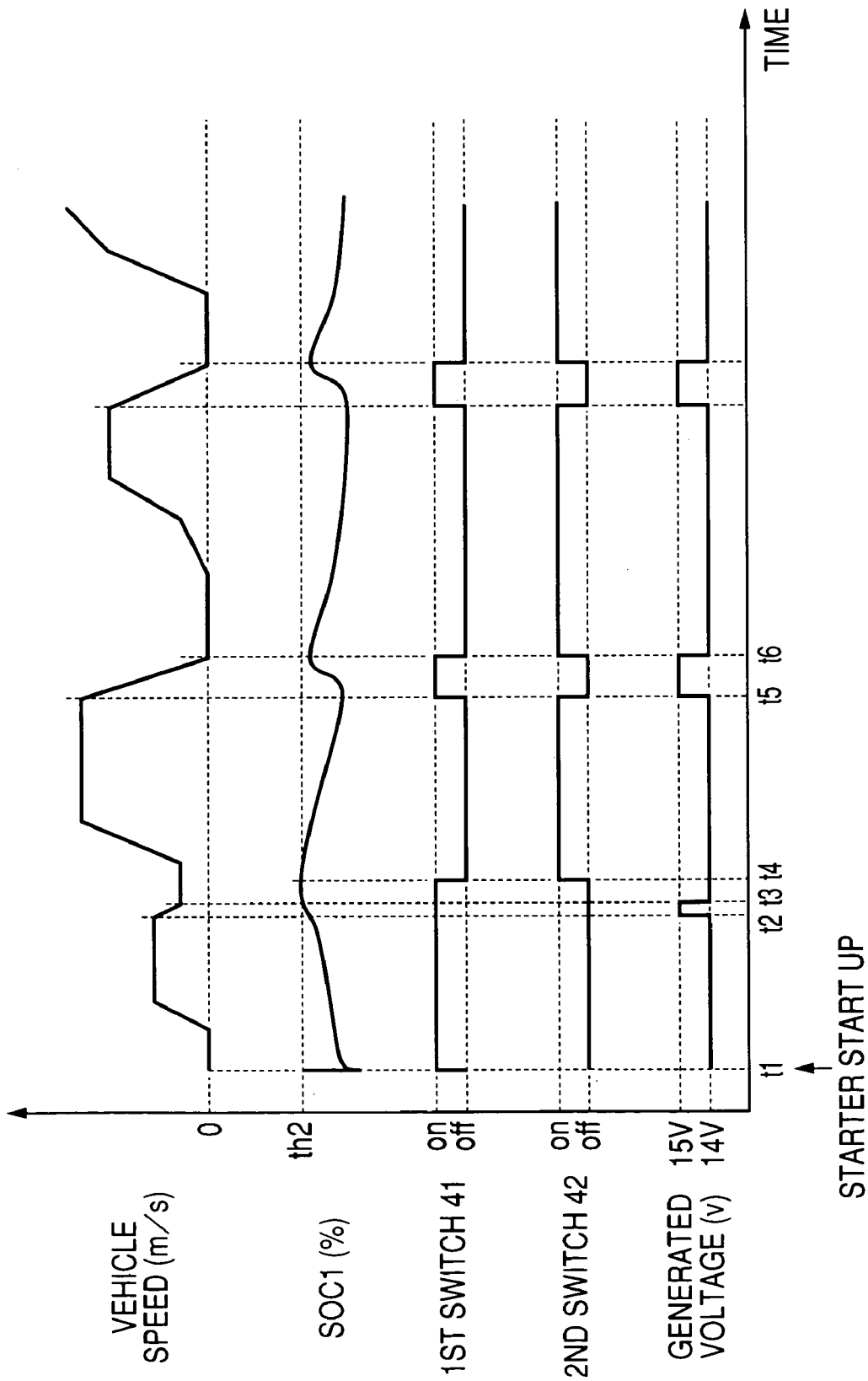
FIG. 10 is a time chart which shows on-off operations of a first and a second switch in terms of the speed of a vehicle, the state of charge of a first battery, and the voltage developed by a generator.

FIG. 10 shows an example of controlled time-sequential operations of the first and second switches 41 and 42 in terms of the speed of the vehicle, the first SOC of the first battery 5, and the voltage developed by the generator 3 (i.e., a generated amount of electricity).

In the illustrated example, the engine starter 14 is turned on at time t1. The starter monitor on-off monitor 142 determines that the starter motor is operating. The switch drive signal generator 144 produces the switch control signal to close the first switch 41 and open the second switch 42. At time t1, the speed of the vehicle is zero (0 m/s). The deceleration monitor 141, thus, determines that the vehicle is not decelerating. The electric generation controller 146 controls the operation of the generator 3 to develop a lower voltage of 14V.

Subsequently, when the vehicle begins to decelerate at time t2, the deceleration monitor 141 determines that the vehicle is now decelerating. The electric generation controller 146 controls the generator 3 to develop a higher voltage of 15V. The SOC of the first battery 5 does not yet reach the upper SOC limit th2. The first battery SOC monitor 143 detects such a battery condition. The switch drive signal generator 144 keeps the first switch closed and the second switch 42 opened.

When the vehicle stops decelerating at time t3, the deceleration monitor 141 determines that the vehicle is not now decelerating. The electric generation controller 146 controls the generator 3 to develop a lower voltage of 14V. The SOC of the first battery 5 does not yet reach the upper SOC limit th2. The switch drive signal generator 144 still keeps the first switch closed and the second switch 42 opened.

The SOC of the first battery reaches the upper SOC limit th2 at time t4. The switch drive signal generator 144 produces the switch control signal based on the outputs of the deceleration monitor 141. Specifically, at time t4, the deceleration monitor determines that the vehicle is not decelerating. The switch drive signal generator 144, thus, outputs the switch control signal to open the first switch 41 and close the second switch 42. The electric generation controller 146 keeps the output of the generator 3 at a lower voltage of 14V.

The vehicle starts decelerating at time t5. The deceleration monitor 141 determines that the vehicle is now decelerating. The switch drive signal generator 144 closes the first switch and opens the second switch 42. The electric generation controller 146 controls the operation of the generator 3 to develop a higher voltage of 15V.

The vehicle stops decelerating at time t6. The deceleration monitor 141 determines that the vehicle is not decelerating. The switch drive signal generator 144 opens the first switch 41 and closes the second switch 42. The electric generation controller 146 controls the operation of the generator 3 to develop a lower voltage of 14V. Subsequently, the switch drive controller 11 operates in a similar manner depending upon whether the vehicle is decelerating or not.

As apparent from the above discussion, when the engine starter 14 is operating, the switch drive controller 11 works to assign priority to the first battery 5 connecting with the engine starter 14 to be charged. The engine starter 14, as described above, consumes a large amount of electricity stored in the first battery 5. The switch drive controller 11 charges the first battery 5 instead of the second battery 6 during operation of the engine starter 14, thereby maintaining the SOC of the first battery 5 in a serviceable range at all times.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims. For instance, the automotive power supply system may employ three or more storage batteries and select one of electric connections between the generator 3 and the batteries as functions of parameters, as described in each of the embodiments.

What is claimed is:

1. An automotive power supply system, comprising:
    an electric generator which is driven by an output of an internal combustion engine of a vehicle to produce an electrical energy;
    a plurality of storage batteries which are charged by the electrical energy produced by said electric generator, said storage batteries working to supply electric power to electric devices mounted in the vehicle;
    a switching device working to establish an electric connection between a selected one of the storage batteries and the electric generator to charge the selected one; and
    a switch drive controller working to control an operation of said switching device,
    wherein the storage batteries are different in charging impedance from each other, and said switch drive controller controls said switching device to connect said generator to one of the storage batteries which is lower in the charging impedance than any other of the storage batteries when the vehicle is decelerating; and wherein said switch drive controller also works to increase an amount of electricity produced by said generator when the vehicle is decelerating.

2. An automotive power supply system as set forth in claim 1, wherein said switch drive controller includes (a) a state-of-charge monitor working to monitor a state of charge of each of the storage batteries, (b) a decision circuit working to determine whether the state of charge of each of the storage batteries lies within a given serviceable range or not, and (c) a switch driver working to establish an electric connection between said electric generator and one of the storage batteries which is determined by said decision circuit to have the state of charge thereof lying out of the given serviceable range.

3. An automotive power supply system as set forth in claim 1, wherein at least one of the storage batteries is installed in one of a vehicle cabin and a trunk.

4. An automotive power supply system as set forth in claim 1, wherein the storage batteries are different in rated voltage from each other.

5. An automotive power supply system as set forth in claim 1, wherein said switch drive controller works to switch between electric connections between said electric generator and the storage batteries in a time interval longer than a response time of said electric generator and a response time of each of the storage batteries.

6. An automotive power supply system as set forth in claim 1, wherein said switch drive controller includes (a) a power consumption monitor working to monitor a power consumption of the electric device from a corresponding one of the storage batteries, (b) a connection duration determining circuit working to determine a connection duration for which the electric connection between each of the storage batteries and said electric generator is to be established as a function of the power consumption from a corresponding one of the storage batteries, and (c) a switch driver working to control said switching device so as to establish the electric connection for the connection duration.

7. An automotive power supply system as set forth in claim 6, wherein as the power consumption from each of the storage batteries increase, said connection duration determining circuit increases a corresponding one of the connection durations.

8. An automotive power supply system as set forth in claim 1, wherein said switch drive controller includes (a) an engine starter monitor working to determine whether an engine starter motor is operating or not and (b) a switch driver working to connect said electric generator and one of the storage batteries from which the electrical energy is consumed by the engine starter motor when said engine starter monitor determines that the engine starter motor is operating.

9. An automotive power supply system as set forth in claim 8, wherein said switch drive controller also includes a state-of-charge monitor working to determine whether a state of charge of the one of the storage batteries from which the electrical energy is consumed by the engine starter motor has reached a given level of not, and wherein said switch drive controller continues to establish the electric connection between said electric generator and the one of the storage batteries until the said state-of-charge monitor determines that the state of charge of the one of the storage batteries has reached the given level.

\* \* \* \* \*